(12) United States Patent
Komazawa

(10) Patent No.: US 12,405,754 B2
(45) Date of Patent: Sep. 2, 2025

(54) PRINTING SYSTEM, INFORMATION PROCESSING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Hisao Komazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 515 days.

(21) Appl. No.: 17/715,960

(22) Filed: Apr. 8, 2022

(65) Prior Publication Data

US 2023/0161522 A1 May 25, 2023

(30) Foreign Application Priority Data

Nov. 24, 2021 (JP) .................... 2021-189970

(51) Int. Cl.
*G06F 3/12* (2006.01)
*G06K 15/02* (2006.01)

(52) U.S. Cl.
CPC ............ *G06F 3/121* (2013.01); *G06F 3/1211* (2013.01); *G06F 3/1234* (2013.01); *G06K 15/1836* (2013.01)

(58) Field of Classification Search
CPC ...... G06F 3/121; G06F 3/1211; G06F 3/1234; G06F 3/1247; G06F 3/1208; G06K 15/1836
See application file for complete search history.

(56) References Cited

U.S. PATENT DOCUMENTS

| 8,675,237 B2 | 3/2014 | Matsukawa | |
|---|---|---|---|
| 2012/0002994 A1 | 1/2012 | Moroney | |
| 2015/0261490 A1* | 9/2015 | Fujieda | G06F 3/1253 |
| | | | 358/1.15 |
| 2016/0086062 A1* | 3/2016 | Torii | G06K 15/1813 |
| | | | 358/1.13 |

FOREIGN PATENT DOCUMENTS

JP 2013063543 4/2013

OTHER PUBLICATIONS

"Office Action of Japan Counterpart Application", issued on Jul. 8, 2025, with English translation thereof, p. 1-p. 5.

* cited by examiner

*Primary Examiner* — John R Wallace
(74) *Attorney, Agent, or Firm* — JCIPRNET

(57) ABSTRACT

An information processing apparatus includes a processor configured to perform a first process of generating a rasterized image by rasterizing received image data, perform a second process of generating rasterized images by rasterizing the received image data plural times by a processing unit that performs the first process, and contrast the rasterized image obtained by the first process with the plural rasterized images obtained by the second process performed plural times, and check whether the rasterized image obtained by the first process is invalid.

10 Claims, 10 Drawing Sheets

FIG. 10

|  | RASTERIZED IMAGE 42a | RASTERIZED IMAGE 42b | RASTERIZED IMAGE 42c | RASTERIZED IMAGE 42d | NUMBER OF MATCHES n |
|---|---|---|---|---|---|
| RASTERIZED IMAGE 42a |  | DOES NOT MATCH | MATCH | DOES NOT MATCH | n = 2 |
| RASTERIZED IMAGE 42b | DOES NOT MATCH |  | MATCH | MATCH | n = 2 |
| RASTERIZED IMAGE 42c | MATCH | MATCH |  | MATCH | n = 3 |
| RASTERIZED IMAGE 42d | DOES NOT MATCH | MATCH | MATCH |  | n = 2 |

PRINTING SYSTEM, INFORMATION PROCESSING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-189970 filed Nov. 24, 2021.

BACKGROUND

(i) Technical Field

The present invention relates to a printing system, an information processing apparatus, and a non-transitory computer readable medium storing a program.

(ii) Related Art

For example, in JP2013-63543A discloses an image forming apparatus including reception means that receives image data to be printed; drawing processing means that generates two types of print data by respectively performing drawing processes of the image data received by the reception means and expressed in a first page description language, by using a first drawing method for creating the print data after converting the image data expressed in the first page description language into image data expressed in a second page description language in a case where the presence or absence of a difference in output results is inspected by different drawing methods, and a second drawing method for directly creating the print data from the image data expressed in the first page description language; comparison means that compares the two types of print data generated in the drawing processing means in pixel units; and notification means that notifies a comparison result in the comparison means.

SUMMARY

Here, an event in which a rasterized image generated by rasterizing image data becomes invalid includes a static factor generated by a bug and a dynamic factor arbitrarily generated by a cache or the like. For the static factor, a problem can be detected when a trial operation is performed, but, for the dynamic factor, a print result needs to be inspected after printing the rasterized image to detect invalid printing.

Aspects of non-limiting embodiments of the present disclosure relate to a printing system, an information processing apparatus, and a non-transitory computer readable medium storing a program, which are capable of detecting whether or not a rasterized image is invalid before printing the rasterized image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to perform a first process of generating a rasterized image by rasterizing received image data, perform a second process of generating rasterized images by rasterizing the received image data a plurality of times by a processing unit that performs the first process, and contrast the rasterized image obtained by the first process with a plurality of the rasterized images obtained by the second process performed a plurality of times, and check whether the rasterized image obtained by the first process is invalid.

BRIEF DESCRIPTION OF THE DRAWINGS

Exemplary embodiment(s) of the present invention will be described in detail based on the following figures, wherein:

FIG. 10 is a diagram illustrating a specific example of match determination.

DETAILED DESCRIPTION

Hereinafter, exemplary embodiments of the present invention will be described in detail with reference to the accompanying drawings.

Figure 1:
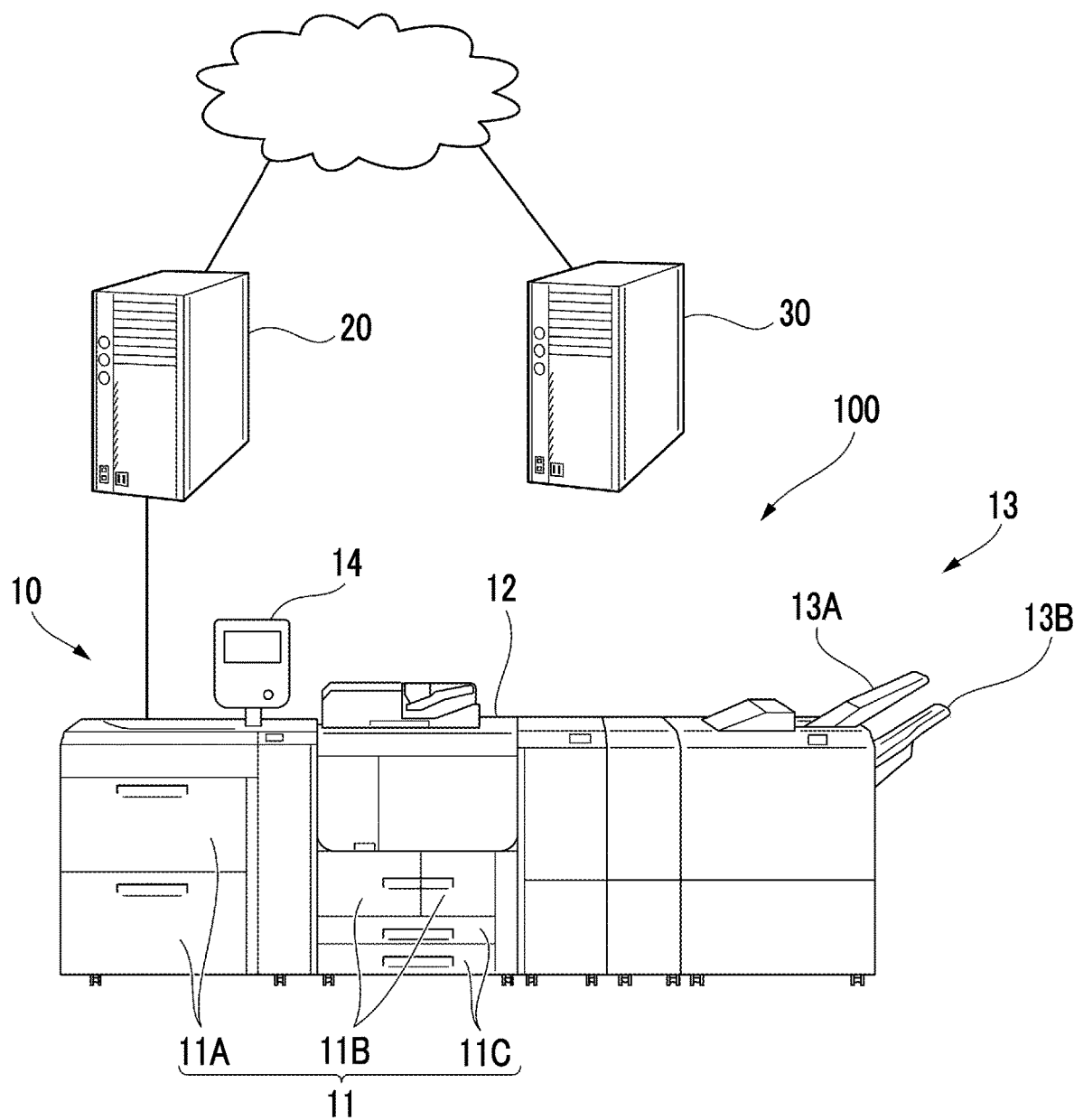
FIG. 1 is a diagram illustrating a configuration of a printing system.

FIG. 1 is a diagram illustrating a configuration of a printing system 100.

The printing system 100 shown in FIG. 1 is configured to include a printing device 10 that performs printing on paper, and server devices 20 and 30 that are connected to the printing device 10 so as to be able to communicate with each other.

As a network connecting the printing device 10 and the server devices 20 and 30, for example, a Local Area Network (LAN) or the Internet is used. However, the network may be a composite type configuration of the LAN and the Internet.

The printing device 10 prints an image on paper based on an acquired print instruction. The print instruction referred to here is an instruction to execute printing, and may include information of an image to be printed or the like.

The printing device 10 is, for example, a so-called production printer used for commercial printing, and has a function capable of executing high-quality and high-speed printing processing. Further, the printing device 10 has a function of verifying a print result on the paper on which the image is printed.

Further, the printing device 10 may have a function capable of executing post-processing according to the print instruction. The post-processing referred to here includes, for example, a process of binding a bundle of paper, a process of folding the paper, a process of cutting the paper, a process of binding a book, and the like.

The printing device 10 is not limited to the production printer, and may be applied to a general printer (business printer, home printer, or the like).

The printing device 10 includes a paper feed unit 11 that feeds paper to be printed, a printing unit 12 that performs printing on paper from the paper feed unit 11, a discharge device 13 that discharges printed paper, and an operation display unit 14 for a user or an operator.

The paper feed unit 11 is configured to include a plurality of paper feed trays 11A, 11B, and 11C for feeding paper. Each of the paper feed trays 11A to 11C can feed paper of different sizes from each other or the same size.

The printing unit 12 may use an electrophotographic method for transferring toner adhered to a charge-exposed photoconductor to a recording material to fix and form an image, and may use, for example, an inkjet method for ejecting ink onto the recording material to form an image.

The printing unit 12 is configured to be capable of executing two-sided printing in which printing is performed on both sides of the paper.

In the present exemplary embodiment, the discharge device 13 is configured to include discharge trays 13A and 13B to which paper is sorted according to an inspection result.

Further, the discharge device 13 is provided with an inspection device 40 for verifying a print result of paper or a printed matter. The inspection device 40 verifies the print result of the printed matter by contrasting print data with scan data of paper printed using the print data based on information indicating an inspection target area and an inspection accuracy which are acquired from the server device 20. Then, the discharge device 13 discharges the paper from any of the discharge trays 13A and 13B according to a result of the inspection device 40.

The operation display unit 14 is configured to include a display unit that displays various images for operations and various information to be notified to the user, and an input unit disposed with various buttons for input according to an operation image of the display unit. The operation display unit 14 may be configured so that a display screen is configured with, for example, a touch panel and the touch panel has functions of the display unit and the input unit.

The printing device 10 according to the present exemplary embodiment has a function of optically reading an image such as a document and a function of sending documents one by one to a reading area, in addition to the function of printing an image on paper. The functions listed for the printing device 10 are merely examples, and do not prevent the printing device 10 from having other functions.

The server devices 20 and 30 may be physically one computer, or may be realized by distributed processing by a plurality of computers. Further, although the server devices 20 and 30 are configured as a shared server that provides a so-called cloud service in the present exemplary embodiment, the server devices 20 and 30 may be on-premises type servers.

In a case where the server device 20 receives a print instruction from, for example, the server device 30, the server device 20 performs rasterization processing after imposition of image data included in the print instruction. A rasterized image, which is an image for which rasterization has been completed, is transmitted to the printing device 10. The server device 20 is an example of an information processing apparatus.

Figure 2:
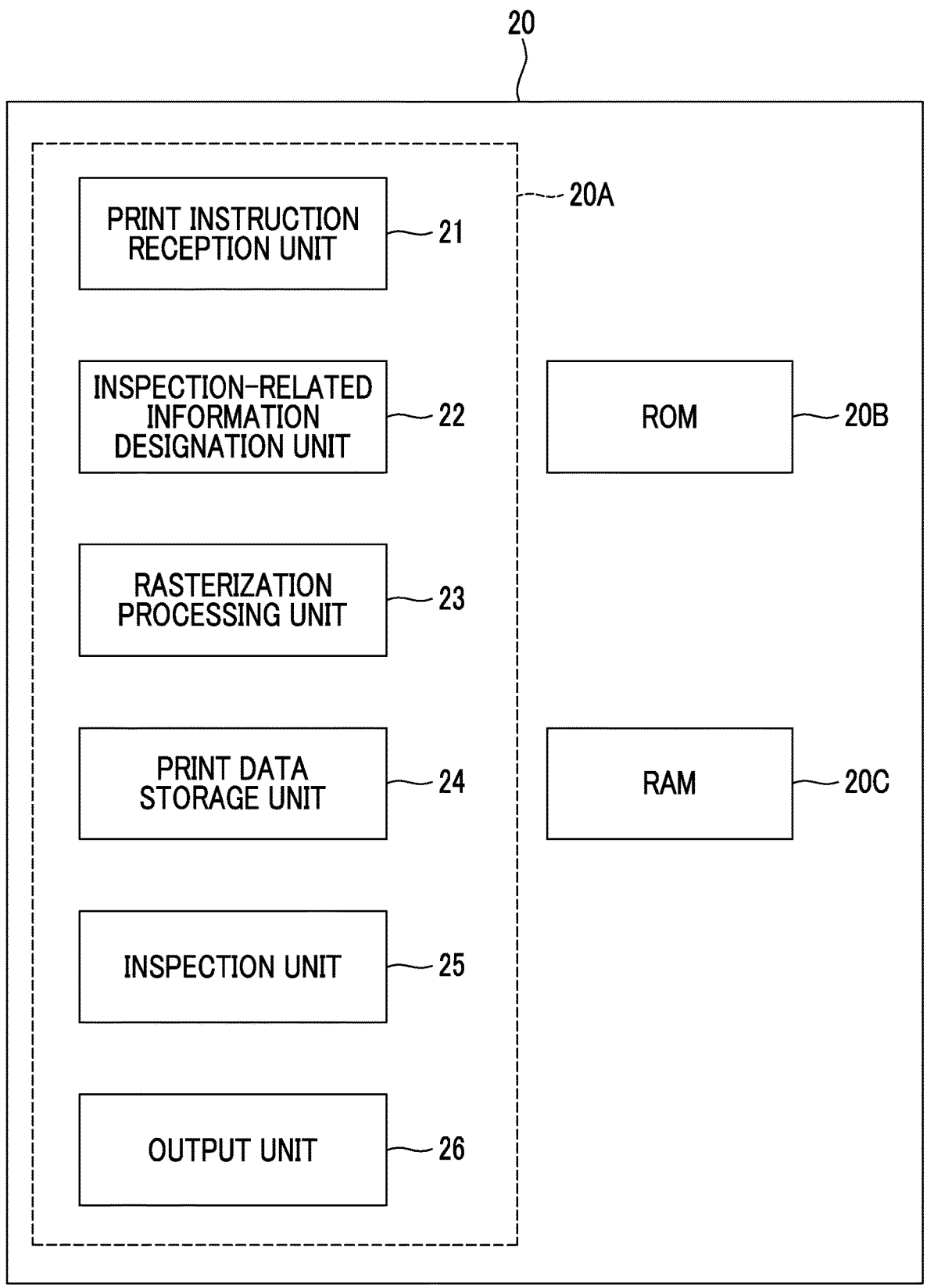
FIG. 2 is a functional block diagram of a server device.

FIG. 2 is a functional block diagram of the server device 20.

As shown in FIG. 2, the server device 20 is configured to include a print instruction reception unit 21, an inspection-related information designation unit 22, a rasterization processing unit 23, a print data storage unit 24, an inspection unit 25, and an output unit 26.

The print instruction reception unit 21 receives the print instruction transmitted from the user and manages the received print instruction. The print instruction includes information on the image to be printed.

The inspection-related information designation unit 22 has a function of designating information related to the inspection, such as the number of inspections and an inspection condition, on, for example, a User Interface (UI) screen. A plurality of inspections can be designated as the number of inspections, and a color can be designated as the inspection condition.

In the present exemplary embodiment, a configuration in which the server device 20 includes the inspection-related information designation unit 22 is adopted, but the present invention is not limited thereto. A configuration in which the printing device 10 or another server device 30 includes the inspection-related information designation unit 22 may be adopted.

The rasterization processing unit 23 performs the rasterization processing according to the print instruction received by the print instruction reception unit 21, and generates the print data which is the rasterized image. The rasterization processing unit 23 is an example of a processing unit that performs a first process.

As will be described later, the print data is transmitted to the printing device 10 by the output unit 26 after the inspection is performed by the inspection unit 25.

More specifically, the rasterization processing unit 23 performs the rasterization processing by a drawing method using software called Adobe PDF Print Engine (APPE). Further, instead of the Adobe PDF Print Engine (APPE), a configuration may be provided in which the rasterization processing is performed by a drawing method using software called Configurable PostScript Interpreter (CPSI).

The CPSI referred to here is a drawing method using software for creating print data in bitmap format from image data (hereinafter, referred to as PDF data) expressed by Portable Document Format (PDF) widely used as a document format and a page description language, and generates the print data by converting once the PDF data into image data (hereinafter, referred to as PostScript data) expressed in a page description language called PostScript (registered trademark) and by performing drawing processing based on the PostScript data.

The CPSI is sometimes referred to as high quality RIP.

Further, the APPE referred to here is a drawing method using software capable of directly performing the drawing processing on the PDF data to create the print data. Therefore, the APPE can perform high-speed processing compared to a case of the CPSI for once converting the PDF data into PostScript data, which is an intermediate file format. However, there is a possibility that text corruption or the like occurs when the rasterization is performed, compared to the CPSI.

The APPE is sometimes referred to as high-speed RIP.

The rasterization processing unit 23 generates a plurality of rasterized images by the above-described APPE. That is, for the print instruction received by the print instruction reception unit 21, the rasterization processing unit 23 generates a plurality of rasterized images (hereinafter, referred to as rasterized images for inspection) used for the inspection in the inspection unit 25, in addition to a rasterized image (hereinafter, referred to as a rasterized image for printing) as the print data used for printing in the printing device 10.

The print data storage unit 24 stores the plurality of rasterized images generated by the rasterization processing unit 23 together with attribute information. The attribute information includes information indicating the print instruction, information indicating a resolution of an image obtained by the rasterization processing, and the like. The resolution of the image referred to here is a value of dpi, which is the number of pixels arranged in one inch.

The inspection unit 25 performs inspection using the plurality of rasterized images stored by the print data storage unit 24. The inspection is performed by comparing the rasterized image for printing with the rasterized images for inspection in dot (pixel) units.

In a case where all the dots of the rasterized images to be compared are identical, the inspection unit 25 transmits an inspection result that the rasterized image for printing is identical to the rasterized images for inspection and the rasterized image for printing is not invalid to the output unit 26. Otherwise, the inspection unit 25 transmits an inspection result that the rasterized image for printing is not identical to the rasterized images for inspection and the rasterized image for printing is invalid to the output unit 26.

The inspection unit 25 may transmit the inspection result that the rasterized image for printing is not invalid in a case where a deviation between the rasterized images to be compared is within one dot.

The output unit 26 outputs the rasterized image for printing to the printing device 10 in a case where the inspection result of the inspection unit 25 is that the rasterized image is not invalid. On the other hand, in a case where the inspection result of the inspection unit 25 is that the rasterized image is invalid, the output unit 26 performs processing of preventing the rasterized image for printing from being output to the printing device 10. In a case where the rasterized image for printing is not output to the printing device 10, the rasterized image for printing may be displayed on the UI screen.

In the processing by the output unit 26, the print instruction may be used as a unit or a sheet may be used as a unit. Further, the output unit 26 may output the rasterized image for printing to the printing device 10 without waiting for the inspection result of the inspection unit 25.

Here, each function of the server device 20 is realized by a CPU 20A as an example of a processor. The CPU 20A reads a program stored in a Read Only Memory (ROM) 20B, and executes the program using a Random Access Memory (RAM) 20C as a work area. Here, the program executed by the CPU 20A may be provided to the server device 20 in a state of being stored in a computer-readable recording medium such as a magnetic recording medium (such as a magnetic tape or a magnetic disk), an optical recording medium (such as an optical disk), a magneto-optical recording medium, or a semiconductor memory. Further, the program executed by the CPU 20A may be downloaded to the server device 20 by using communication means such as the Internet.

Further, in the present exemplary embodiment, each function of the server device 20 is realized by software, but the present invention is not limited thereto, and may be realized by, for example, an Application Specific IC (ASIC).

Next, a processing example in a case where the print instruction is received will be described with reference to FIGS. 3 to 5.

Figure 3:
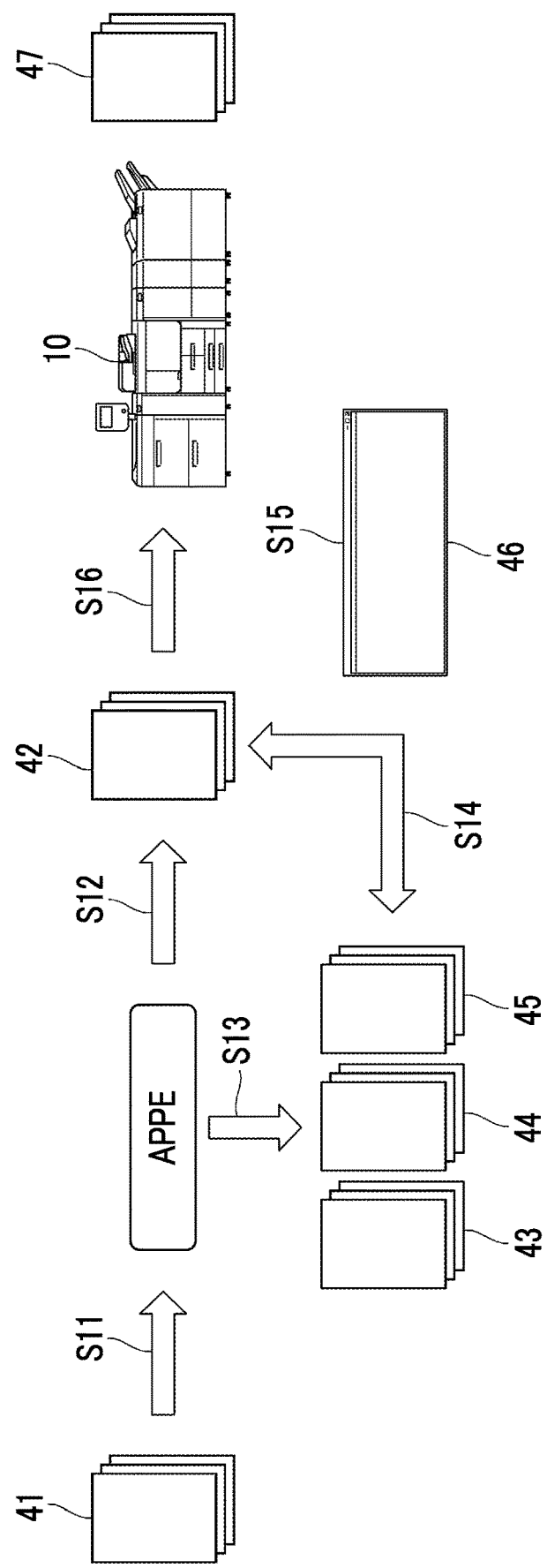
FIG. 3 is a diagram illustrating a first example as a processing example in a case where a print instruction is received.
Figure 4:
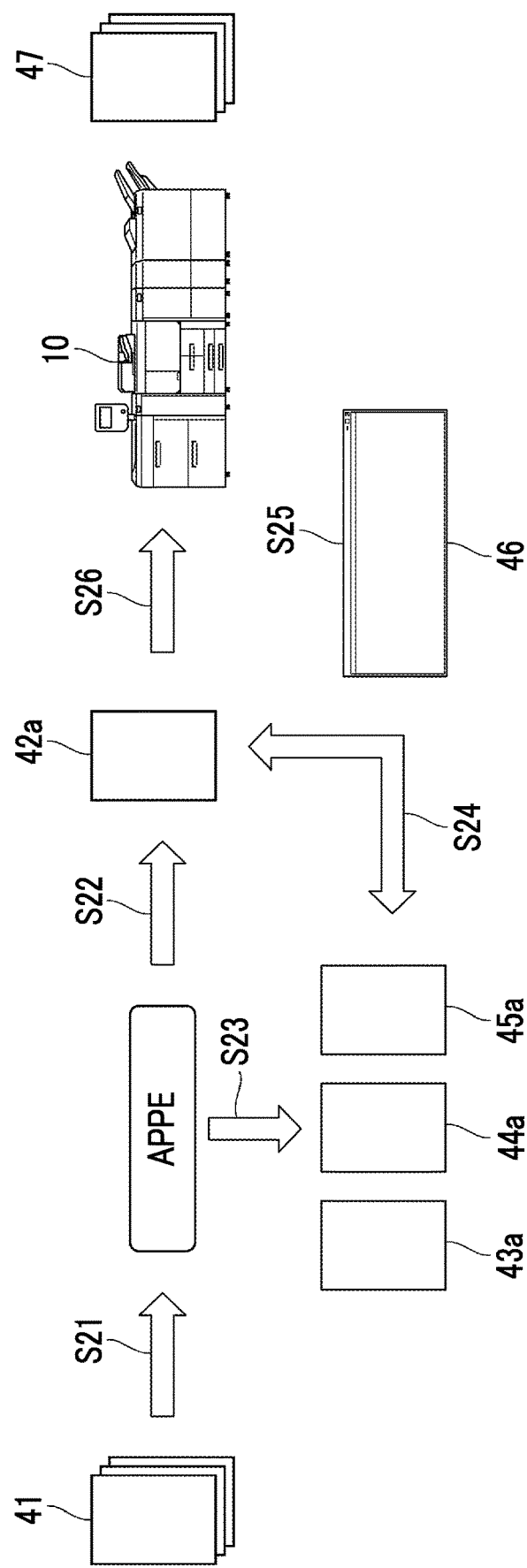
FIG. 4 is a diagram illustrating a second example as the processing example in the case where the print instruction is received.
Figure 5:
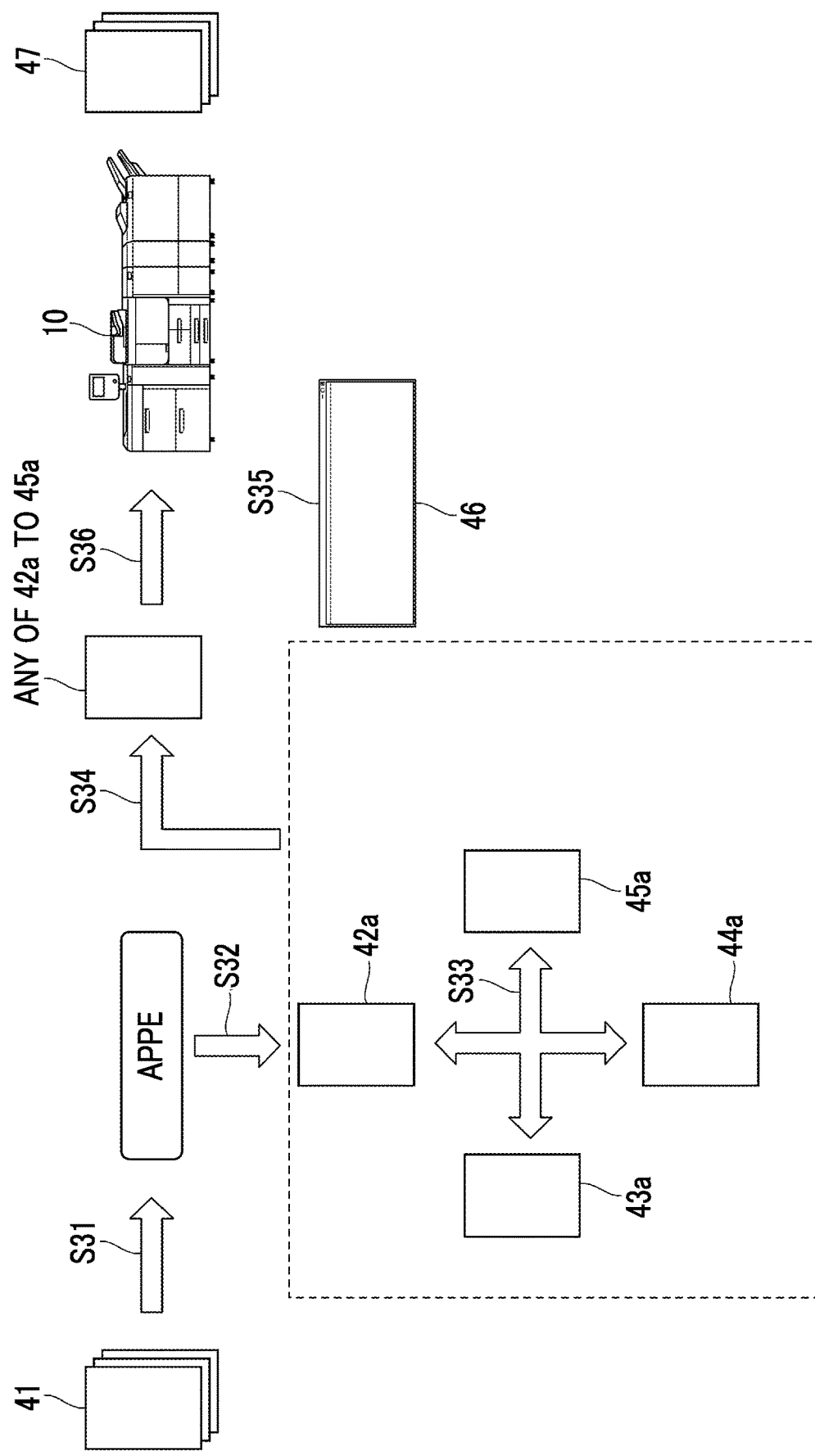
FIG. 5 is a diagram illustrating a third example as the processing example in the case where the print instruction is received.

FIGS. 3 to 5 are diagrams illustrating the processing example in a case where the print instruction is received, FIG. 3 is a first example, FIG. 4 is a second example, and FIG. 5 is a third example.

First Example

In the first example shown in FIG. 3, in a case where the print instruction reception unit 21 (see FIG. 2) receives a print instruction 41, the print instruction reception unit 21 transmits the print instruction 41 to the rasterization processing unit 23 (see FIG. 2) (step S11).

In a case where the rasterization processing unit 23 receives the print instruction 41, a rasterized image 42 for printing is created by the APPE based on the received print instruction 41 (step S12).

Further, the rasterization processing unit 23 creates a plurality of rasterized images for inspection by the APPE according to inspection-related information by the inspection-related information designation unit 22 (see FIG. 2) based on the received print instruction 41 (step S13). In the first example, rasterized images 43, 44, and 45 are generated.

All the rasterized images 42 and 43 to 45 generated in this way are created for all sheets based on the same print instruction, and all the rasterized images 42 and 43 to 45 are created by the APPE. The rasterized images 42 to 45 are stored in the print data storage unit 24 (see FIG. 2).

A process of creating the rasterized image 42 for printing based on the received print instruction 41 is an example of the first process, and a process of creating the rasterized images 43 to 45 for inspection based on the received print instruction 41 is an example of a second process.

Next, the inspection unit 25 (see FIG. 2) inspects all the sheets of the rasterized image 42 stored in the print data storage unit 24 using the rasterized images 43 to 45 (step S14).

That is, whether or not the rasterized image 42 of all the sheets is invalid is inspected by comparing each of the sheets of the rasterized image 42 with the rasterized image 43 of the rasterized images 43 to 45 in pixel units and determining whether or not the pixels of the rasterized image 42 are identical to the pixels of the rasterized image 43.

A similar inspection is performed using the rasterized image 44 and, further, is performed using the rasterized image 45. In this way, the inspection unit 25 contrasts the rasterized images 42 to 45 and checks whether the rasterized image 42 is invalid.

An inspection result 46 is displayed on the UI screen (step S15). The number of inspections is displayed in the inspection result 46.

In a case where each pixel of the rasterized image 42 is identical to each pixel of the rasterized images 43 to 45 as a result of the inspection by the inspection unit 25, it is determined that the rasterized image 42 is not invalid, and the output unit 26 (see FIG. 2) outputs the rasterized image 42 to the printing device 10 (step S16). On the other hand, in a case where the rasterized image 42 is invalid, the output unit 26 does not output the rasterized image 42 to the printing device 10.

In a case where the rasterized image 42 is output to the printing device 10, the printing device 10 prints the rasterized image 42 and discharges a printed matter 47. On the other hand, in a case where the rasterized image 42 is invalid, the rasterized image 42 is not output to the printing device 10, so that the invalid rasterized image 42 is prevented from being printed by the printing device 10.

In this way, it is detected whether the rasterized image 42 is invalid before printing.

Second Example

Since the second example shown in FIG. 4 contains the same content as the first example shown in FIG. 3, the same reference numerals are used for the same parts, and steps S21 to S26 correspond to steps S11 to S16, respectively. The second example is different from the first example, in which the inspection is performed on the entire sheet, in that the inspection is performed in sheet units.

As shown in FIG. 4, in the second example, in a case where the print instruction reception unit 21 transmits the received print instruction 41 to the rasterization processing unit 23 (step S21), the rasterization processing unit 23 creates rasterized images 42*a*, 43*a*, 44*a*, and 45*a* of a first sheet among all sheets (the number of all sheets is n) by the APPE based on the received print instruction 41 (steps S22 and S23). The created rasterized images 42*a* to 45*a* are stored in the print data storage unit 24.

A process of creating the rasterized image 42*a* for printing based on the received print instruction 41 is an example of the first process, and a process of creating the rasterized images 43*a* to 45*a* for inspection based on the received print instruction 41 is an example of the second process.

The inspection unit 25 (see FIG. 2) determines whether or not the rasterized image 42*a* is invalid by comparing the rasterized image 42*a* of the first sheet with the rasterized image 43*a* of the first sheet in pixel units.

Similarly, the inspection unit 25 determines whether or not the rasterized images 42*a* is invalid by comparing the rasterized images 42*a* and 44*a* of the first sheet in pixel units. Then, the inspection unit 25 determines whether or not the rasterized images 42*a* is invalid by comparing the rasterized images 42*a* and 45*a* of the first sheet in pixel units.

The inspection result 46 obtained by the inspection is displayed on the UI screen (step S25).

The rasterized image 44*a* is generated after the inspection of the rasterized images 42*a* and 43*a* ends, and the rasterized image 45*a* is generated after the inspection of the rasterized images 42*a* and 44*a* ends. In addition to the cases, the rasterized images 44*a* and 45*a* may be generated before the inspection of the rasterized images 42*a* and 43*a*.

In a case where each pixel of the rasterized images 42*a* to 45*a* of the first sheet is identical to each other as the result of the inspection by the inspection unit 25, it is determined that the rasterized image 42*a* is not invalid, and the output unit 26 (see FIG. 2) outputs the rasterized image 42*a* to the printing device 10 (step S26). On the other hand, in a case where the rasterized image 42*a* is invalid, the output unit 26 does not output the rasterized image 42*a* to the printing device 10.

In a case where the inspection of the first sheet ends and the inspection unit 25 notifies the rasterization processing unit 23 of the completion of the inspection, the rasterization processing unit 23 creates rasterized images 42*b* to 45*b* of a second sheet, and the inspection unit 25 inspects the second sheet.

A printed matter 47 is formed by repeating the processing up to a p-th sheet which is the final sheet.

As described above, in the second example, since the inspection and printing are performed in sheet units for the print instruction, the invalid rasterized image is prevented from being printed in sheet units.

In the second example, the rasterized images of the second sheet are created after the inspection of the first sheet ends, but the present invention is not limited thereto. For example, in a case where the inspection of the rasterized images 42*a* to 45*a* of the first sheet are being performed, the rasterized images 42*b* to 45*b*, . . . , 42*p* to 45*p* may be created for the second to p-th sheet and may be stored in the print data storage unit 24.

Third Example

Since the third example shown in FIG. 5 contains the same content as the second example shown in FIG. 4, the same reference numerals are used for the same parts, and steps S31, S33, S35, and S36 among steps S31 to S36 corresponding to steps S21 and S24 to S26, respectively, and the description thereof may be omitted. The third example is common to the first example in that the inspection is performed in sheet units.

As shown in FIG. 5, in the third example, the rasterization processing unit 23 creates rasterized images 42*a*, 43*a*, 44*a*, and 45*a* of the first sheet among all sheets (the number of all sheets is p) by the APPE based on the print instruction 41 transmitted from the print instruction reception unit 21 (steps S31 and S32).

The inspection unit 25 contrasts a combination of two rasterized images among the rasterized images 42*a*, 43*a*, 44*a*, and 45*a* in pixel units. That is, the contrast in pixel units is performed for a combination of the rasterized images 42*a* and 43*a*, a combination of the rasterized images 42*a* and 44*a*, a combination of the rasterized images 42*a* and 45*a*, a combination of the rasterized images 43*a* and 44*a*, a combination of the rasterized images 43*a* and 45*a*, and a rasterized images 44*a* and 45*a*.

By contrasting the six combinations, the rasterized image, which has the highest possibility of being not invalid, is selected (step S34). That is, any one rasterized image of the rasterized images 42*a* to 45*a* is selected.

The output unit 26 outputs the selected rasterized image to the printing device 10.

Then, as in the second example, the printed matter 47 is formed by repeating the process of inspecting the second sheet after the inspection of the first sheet up to a p-th sheet which is the final sheet.

As described above, unlike the first example and the second example in which the rasterized image for printing and the rasterized images for inspection are separated, in the third example, any one rasterized image, which has the highest possibility of being not invalid, of the four rasterized images 42*a* to 45*a* is output to the printing device 10 as the rasterized image for printing.

In a case of the third example, the rasterized image 42*a* is an example of a rasterized image obtained by the first process, and the rasterized images 43*a* to 45*a* are examples of the plurality of rasterized images obtained by the second process.

Here, in the above-described first to third examples, in addition to a case where the resolutions of the rasterized images 42 to 45 and 42*a* to 45*a* by the rasterization processing unit 23 are the same dpi value for each other (for example, 1200 dpi, 300 dpi, or the like), a case may be considered where the resolutions of the rasterized images are different dpi values from each other. The resolution obtained in a case where the rasterized images 42a to 45a are generated is an example of a predetermined condition.

For example, in the first example, the resolution of the rasterized image 42 for printing may be 1200 dpi and the resolutions of the rasterized images 43 to 45 for inspection may also be 1200 dpi. That is, the resolutions of the rasterized images 43 to 45 for inspection are the same as the resolution of the rasterized image 42 for printing.

The case is useful in the above-described third example in which the rasterized image for printing is selected from the rasterized images 42a to 45a. In the third example, the resolutions of the rasterized images 43a to 45a may be lower than the resolution of the rasterized image 42a.

Further, the resolution of the rasterized image 42 for printing may be 1200 dpi, and the resolutions of the rasterized images 43 to 45 for inspection may be 300 dpi which is lower than the resolution of the rasterized image for printing. That is, in the first example, the resolutions of the rasterized images 43 to 45 for inspection may be lower than the resolution of the rasterized image 42 for printing.

In the case, while the printed matter has a high resolution, a processing load of the rasterization processing unit 23 associated with the creation of the rasterized images for inspection is reduced. In this sense, it is not preferable that the resolution of the rasterized image 42 for printing is lower than the resolutions of the rasterized images 43 to 45 for inspection.

Figure 6:
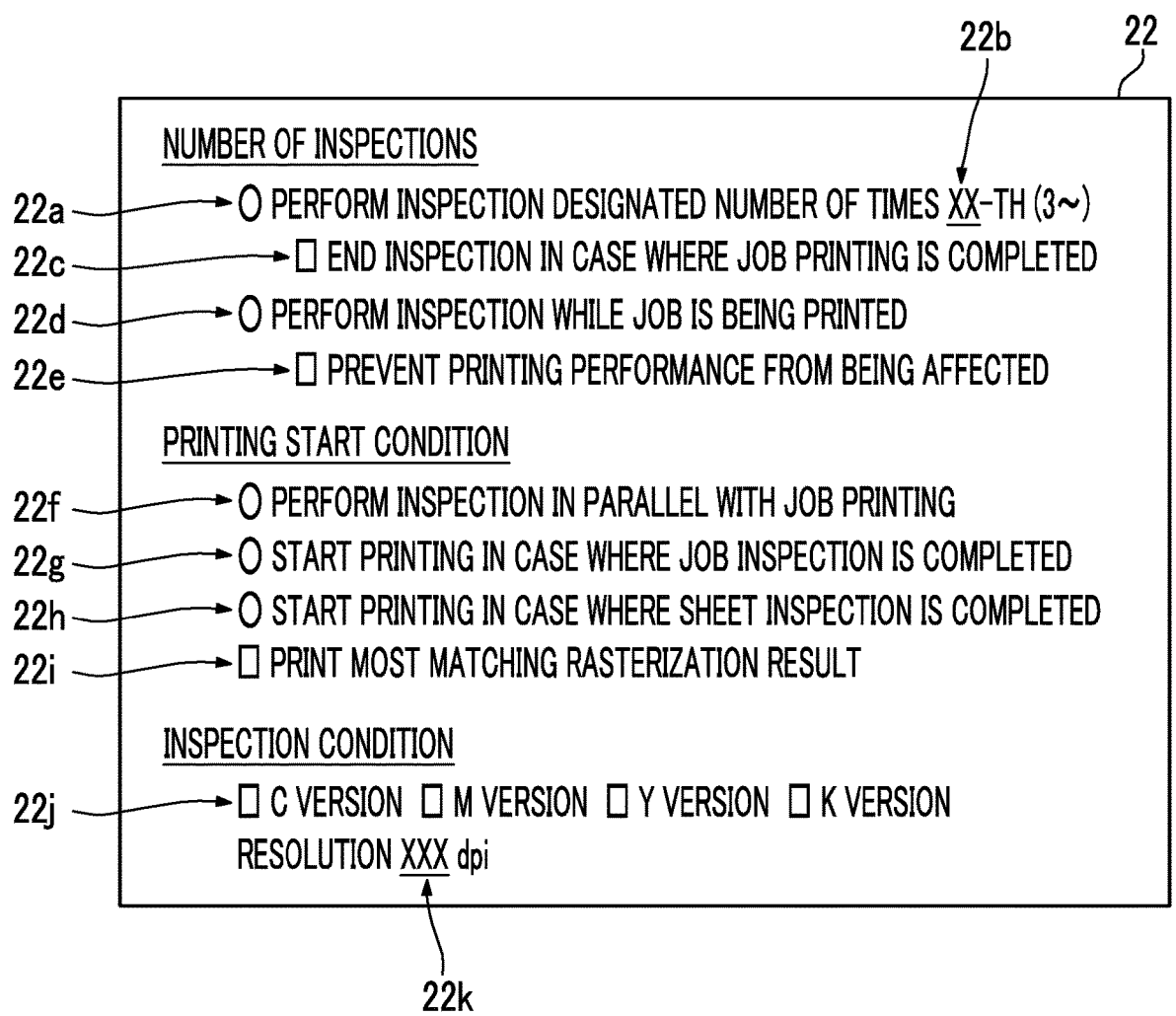
FIG. 6 is a diagram illustrating an example of a screen for setting inspection-related information by an inspection-related information designation unit.

FIG. 6 is a diagram illustrating an example of a screen for setting the inspection-related information by the inspection-related information designation unit 22.

The example of the screen shown in FIG. 6 is a UI screen displayed in a case where the inspection-related information is set by the server device 20 (see FIG. 1), and selectable items 22a to 22k are displayed. The inspection-related information includes the number of inspections, a printing start condition, and an inspection condition.

In the items 22a to 22k, the items 22a to 22e are classified as the number of inspections, the items 22f to 22i are classified as the printing start condition, and the items 22j to 22k are classified as the inspection condition.

In the items 22a to 22k in FIG. 6, the items 22b and 22k are provided with input areas, and the items 22a and 22c to 22j are provided with radio buttons and check boxes.

The radio buttons and check boxes referred to here are areas for instructing selection from the plurality of items. More specifically, the radio button indicates any one selectable item and is illustrated in a square shape in FIG. 6. Further, the check box indicates a plurality of selectable items and is illustrated as a circle shape in FIG. 6.

Setting content set using the UI screen is notified to the inspection unit 25, and is also notified to the rasterization processing unit 23 as necessary.

Any one of the items 22a and 22d can be selected for the number of inspections on the UI screen. In a case where the item 22a is selected, an instruction can be performed with respect to the items 22b and 22c. In a case where the item 22d is selected, an instruction can be performed with respect to the item 22e.

The items 22a and 22d are check boxes, and the items 22c and 22e are radio buttons.

The item 22a "perform inspection a designated number of times" is selected in a case of designating the number of times that inspection is performed by the inspection unit 25, and the item 22d "perform inspection while job is printing" is selected in a case of designating that the inspection is performed only during a period, for which the printing device 10 (for example, see FIG. 1) is performing the printing, instead of the number of times. The "job" referred to here corresponds to the above-described print instruction.

The item 22b that can be instructed in a case where the item 22a is selected is "XX times (equal to or larger than 3)", and an integer, which is equal to or larger than 3, can be input with respect to the input area as the designated number of times. In a case where the integer is equal to or larger than 3, for example, a value of 100 can be input. Considering a case where a value of 2 can be set, for example, in a case where the first time matches but the second time does not match, the inspection result of whether or not invalid cannot be obtained, so that the designated number of times is set to the value which is equal to or larger than 3. In addition, the designated number of times may be an odd number which is equal to or larger than 3.

The item 22c, which can be instructed in a case where the item 22a is selected, is "to end inspection in a case where job printing is completed", and, in a case where the printing is completed during the inspection performed the designated number of times, the inspection ends before reaching the designated number of times.

In a case where the instruction of item 22c is not given, the inspection is performed until the designated number of times is reached even in a case where the printing is completed.

The item 22e, which can be instructed in a case where the item 22d is selected, is "to prevent printing performance from being affected". The "prevent printing performance from being affected" indicates "perform control to prioritize printing over inspection in a case where a predetermined event occurs.

For example, the amount of buffer that temporarily stores the rasterized image for printing, which is completely inspected, is detected, the inspection is interrupted in a case where the number of pages is equal to or smaller than a predetermined number, and the inspection is restarted for a subsequent rasterized image in a case where the number of pages is recovered. Therefore, from the time at which the inspection is interrupted to the time at which the inspection is restarted, the inspection is suppressed and printing is performed without the inspection.

Here, with the above-described interruption of the inspection, a process of generating the rasterized images for inspection is interrupted. That is, the rasterized image for printing by the process as an example of the first process is generated, and the rasterized images for inspection by the process as an example of the second process is not generated.

In a case where the instruction of item 22e is not performed, the inspection is prioritized over the printing.

In other words, according to the item 22e, the process of generating the rasterized images for inspection is interrupted in a case where a condition related to the printing performance on the recording medium is satisfied. The condition related to the printing performance on the recording medium referred to here is a condition for preventing the printing performance from being affected, and includes, for example, the amount of the buffer and the like. Based on the condition, it is determined whether or not to perform second and subsequent inspections.

Any one of the items 22f to 22h can be selected for the printing start condition of the UI screen, and the item 22i can be selected. The items 22f to 22h are check boxes, and the item 22i is a radio button.

The item 22f is "to perform inspection in parallel with the job printing", the item 22g is "to start printing in a case where job inspection is completed", and the item 22h is "to start printing in a case where sheet inspection is completed".

It can be said that the items 22f to 22h of the printing start condition designate time at which the inspection is performed in relation to printing, and designate a time at which the rasterized images for inspection are generated. The time at which the rasterized images for inspection designated by the items 22f to 22h are generated is an example of a time according to a predetermined setting.

The item 22f "perform inspection in parallel with job printing" is selected in a case where printing is started before the inspection result is obtained. On the other hand, the item 22g "start printing in a case where job inspection is completed" and the item 22h "start printing in a case where sheet inspection is completed" are selected in a case where printing is started after the inspection result is obtained.

In other words, by selecting the items 22g and 22h, the generation of the rasterized images for inspection by a process as an example of the second process is performed before the printing of the rasterized image for printing by a process as an example of the first process is started.

In other words, for the items 22c and 22d, the generation of the rasterized images for inspection by the process as the example of the second process is not performed at a time after the printing of the rasterized image for printing by the process as the example of the first process ends.

Here, in a case where the difference between the item 22g and the item 22h is described, the item 22g indicates a case where printing is performed after the inspection of all the rasterized images of the print instruction is completed, in contrast, the item 22h indicates a case where the rasterized images are inspected and printed for each sheet (for each one paper) of the print instruction.

In other words, in a case where the print instruction is to perform printing from a first sheet to a p-th sheet, the item 22g is to inspect the rasterized images from the first sheet to the p-th sheet and to start printing up to the p-th sheet after checking that there is no invalid rasterized image. In contrast, item 22h is to start printing the first rasterized image after inspecting the rasterized images of the first sheet and checking that the rasterized images are not invalid, and the inspection and printing for each sheet are repeated up to the last p-th sheet. Therefore, as compared with the item 22g, in the case of item 22h, the first sheet is discharged from the printing device 10. In contrast, in a case where any of the subsequent sheets is invalid, there is a possibility that the printed matters which have been discharged until then become waste paper.

The item 22i included in the printing start condition, that is, "to print the most matching rasterization result" designates a process according to the above-described third example. That is, in a case where the item 22i is selected, the rasterized image that is considered to be the least invalid among the plurality of rasterized images is printed.

The item 22j can be selected for an inspection condition of the UI screen, and the instruction with respect to the item 22k becomes possible in a case where the item 22j is selected. The item 22j can be selected from one or more by the check boxes of C version, M version, Y version and K version. For an input area in "resolution XXX dpi" of the item 22k, for example, a value, such as 300 or 1200, can be input as an inspection resolution.

In addition to the C version, the M version, the Y version, and the K version, a special version, for example, a gold version or a silver version may be provided.

Next, first to third exemplary embodiments of an example of a processing procedure of the server device 20 will be described with reference to FIGS. 7 to 10.

The generation of the rasterized images according to the first to third exemplary embodiments is not performed for all the sheets at once regardless of an inspection timing, but is performed for each sheet. That is, the generation of the rasterized image is performed in a procedure of creating the rasterized images of the first sheet, inspecting the rasterized images, and creating the rasterized images of a next sheet in a case where the inspection ends.

First Exemplary Embodiment

Figure 7:
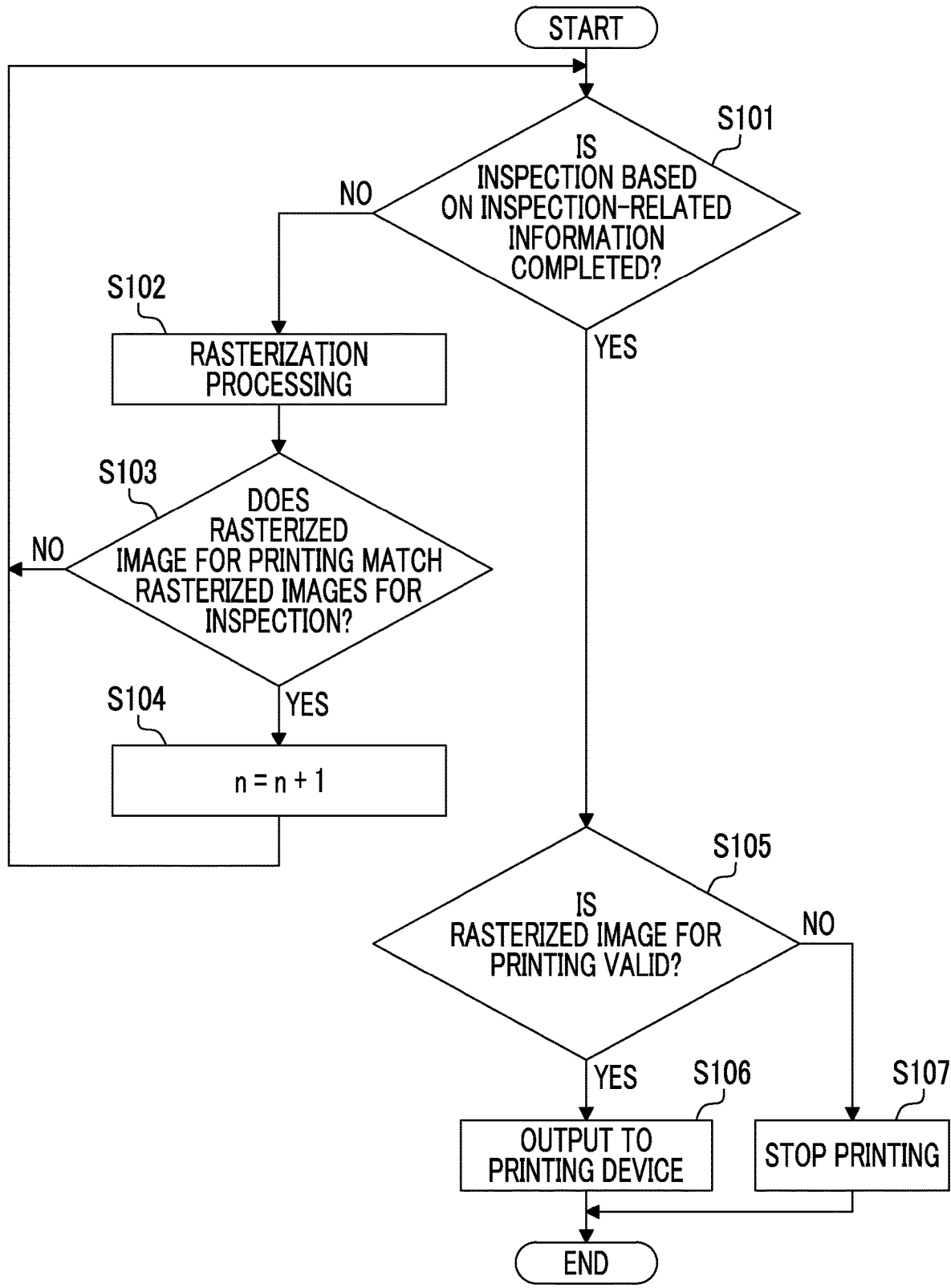
FIG. 7 is a flowchart illustrating an example of a processing procedure of a server device according to a first exemplary embodiment.

FIG. 7 is a flowchart illustrating an example of the processing procedure of the server device 20 according to the first exemplary embodiment. The first exemplary embodiment corresponds to the above-described first example (see FIG. 3), in which all the rasterized images according to the print instruction are inspected and then output to the printing device 10 in units of print instructions, and the above-described second example (see FIG. 4) in which the rasterized images according to the print instruction are generated and inspected in order and output to the printing device 10 in sheet units.

As described above, in a case where the print instruction reception unit 21 (see FIG. 2) of the server device 20 receives the print instruction, the rasterization processing unit 23 (see FIG. 2) generates a rasterized image corresponding to the print instruction. Then, the inspection unit 25 (see FIG. 2) inspects whether or not the rasterized image is invalid by using the inspection-related information by the inspection-related information designation unit 22 (see FIG. 2).

Then, as described above, since a next rasterized image is created and inspected after the rasterized image is created and inspected, as shown in FIG. 7, the inspection unit 25 checks whether or not the inspection based on the inspection-related information is completed (step S101).

In a case where the inspection based on the inspection-related information is not completed (No in step S101), the rasterization processing for generating the next rasterized image is performed (step S102). As in the first example described above, the rasterized image for printing (see reference numeral 42 in FIG. 3) and the plurality of rasterized images for inspection (see reference numerals 43 to 45 in FIG. 3) are created by the rasterization processing.

Whether or not the rasterized image for printing matches the rasterized images for inspection is checked (step S103). In a case where the rasterized images match (YES in step S103), 1 is added to a variable n (step S104), and the process returns to step S101. In a case where the rasterized image does not match (No in step S103), the process returns to step S101 as it is.

In a case where the inspection based on the inspection-related information is completed (YES in step S101), it is determined whether or not the rasterized image for printing is invalid (step S105). The determination is performed by the value of the variable n. The value of the variable n is the number of times of match as the result of the inspection, and the maximum value is a value designated as the number of inspections.

The number of inspections (see reference numeral 22a in FIG. 6) is designated as 3, and the maximum value of the variable n is 3. In a case where the variable n is 3, it is determined that the rasterized image 42 for printing is not invalid. Further, even in a case where the variable n is 2, setting may be performed so that it is determined that the rasterized image 42 for printing is not invalid. In contrast, setting may be performed so that it is determined that the rasterized image 42 for printing is invalid.

The determination of whether or not the rasterized image for printing is invalid (see step S103) is performed in predetermined units. For example, the predetermined unit may include a case of a part of the image data (in sheet units) received as one print instruction (see FIG. 4 of the second example), in addition to a case of the entirety of the image data (in print instruction units) received as one print instruction (see FIG. 3 of the first example).

In a case where the rasterized image for printing is not invalid (YES in step S105), the output unit 26 outputs the rasterized image whose inspection result is not invalid to the printing device 10 (step S106), and, in a case where the rasterized image for printing is invalid (No in step S105), printing is stopped (step S107). As described above, in a case where the rasterized image for printing by the processing as an example of the first process is invalid, an instruction is given to interrupt the printing of the rasterized image for printing on the recording medium.

In a case where printing is stopped, information about the rasterized image that causes the stop of printing may be displayed on the UI screen of the server device 20, or may be displayed on the operation display unit 14 (see FIG. 1) of the printing device 10.

The output to the printing device 10 (see step S106) is performed in predetermined units. For example, in addition to the entirety of the image data received as one print instruction (see FIG. 3 of the first example), a part of the image data may be received as one print instruction (see FIG. 4 of the second example).

Second Exemplary Embodiment

Figure 8:
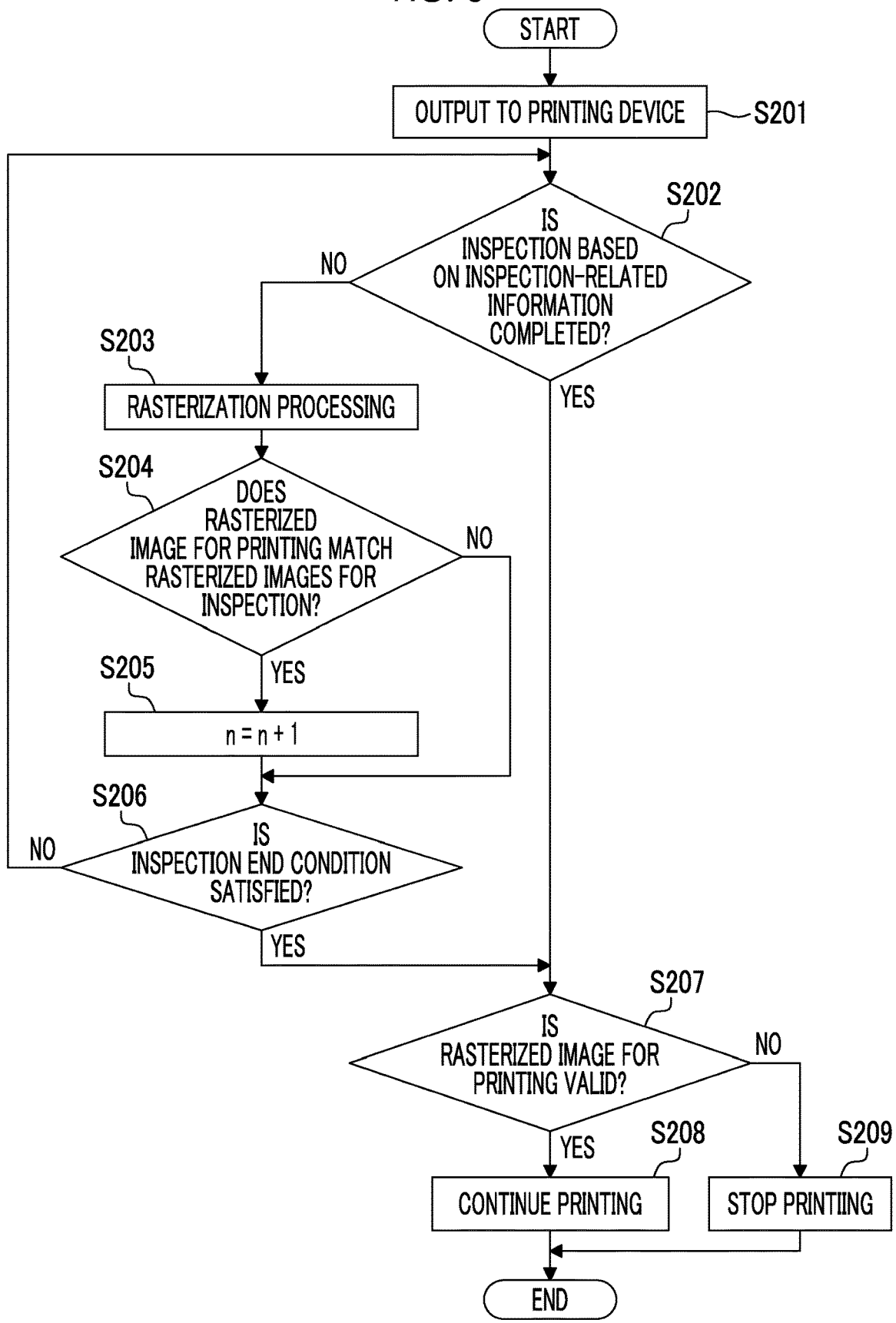
FIG. 8 is a flowchart illustrating an example of a processing procedure of a server device according to a second exemplary embodiment.

FIG. 8 is a flowchart illustrating an example of the processing procedure of the server device 20 according to the second exemplary embodiment. Unlike the first exemplary embodiment in which printing is started after the inspection result is obtained, printing is started before the printing result is obtained in the second exemplary embodiment.

In a case where the print instruction reception unit 21 (see FIG. 2) of the server device 20 receives the print instruction and the rasterized image is generated by the rasterization processing unit 23 (see FIG. 2), the rasterized image before inspection is output to the printing device 10. (step S201). As a result, printing of the printing device 10 is started.

After that, since steps S202 to S205 correspond to steps S101 to S104 in the first exemplary embodiment and step S207 corresponds to step S105, the description thereof may be omitted.

In a case after step S205 or in a case of NO in step S204, the inspection unit 25 determines whether or not an inspection end condition is satisfied (step S206). The inspection end condition referred to here indicates a condition for ending the inspection being executed by the inspection unit 25, and includes, for example, a case where printing of the print instruction ends (see reference numerals 22*c* and 22*d* in FIG. 6).

In a case where the inspection end condition is not satisfied (NO in step S206), the process proceeds to step S202, and, in a case where the inspection end condition is satisfied (YES in step S206), the process proceeds to step S207.

In a case where the rasterized image for printing is not invalid (YES in step S207), printing is continued (step S208), and, in a case where the rasterized image for printing is invalid (No in step S207), printing is stopped (step S209).

Third Exemplary Embodiment

Figure 9:
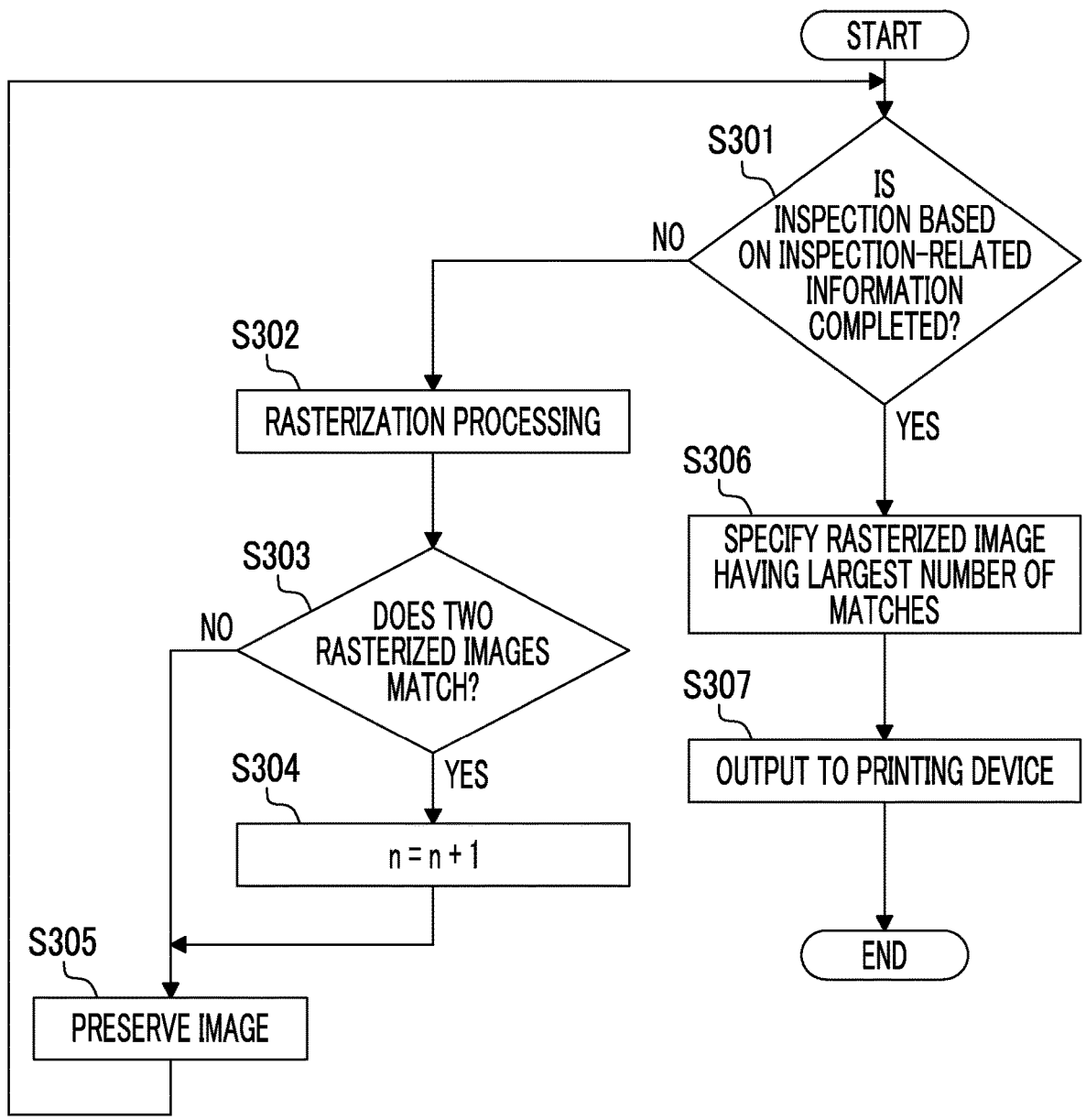
FIG. 9 is a flowchart illustrating an example of a processing procedure of a server device according to a third exemplary embodiment.

FIG. 9 is a flowchart illustrating an example of the processing procedure of the server device 20 according to the third exemplary embodiment, and FIG. 10 is a diagram illustrating a specific example of match determination.

The third exemplary embodiment corresponds to the above-described third example (see FIG. 5) of whether or not to perform a process of performing output to the printing device 10 according to an inspection of whether or not the rasterized image for printing is invalid.

Since steps S301 to S302 and S304 correspond to steps S101 to S102 and 104 in the first exemplary embodiment, the description thereof may be omitted.

After performing the rasterization processing (step S302), the inspection unit 25 determines whether or not the two rasterized images match each other (step S303). In a case where it is determined that the rasterized images match (YES in step S303), 1 is added to the variable n corresponding to a combination of the two rasterized images (step S304), and the two rasterized images are preserved in the print data storage unit 24 (see FIG. 2) (step S305).

In the case of the third example (see FIG. 5), six sets of match determinations are made for the rasterized images 42*a* to 45*a* in the determination in step S303.

As shown in FIG. 10 illustrating the specific example of the match determination, the match determination between the rasterized image 42*a* and the rasterized image 42*b* is performed, the match determination between the rasterized image 42*a* and the rasterized image 42*c* is performed, and the match determination between the rasterized image 42*a* and the rasterized image 42*d* is performed. Further, the match determination between the rasterized image 42*b* and the rasterized image 42*c* is performed, the match determination between the rasterized image 42*b* and the rasterized image 42*d* is performed, and the match determination between the rasterized image 42*c* and the rasterized image 42*d* is also performed.

With reference to the number of matches n shown in FIG. 10, the rasterized images 42*a*, 42*b*, and 42*d* have n=2, and the rasterized images 42*c* have n=3.

Therefore, as shown in FIG. 9, the rasterized image 42*c* is specified as the rasterized image having the largest number of matches (step S306), and the rasterized image 42*c* is output to the printing device 10 (step S307).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
perform a first process of generating a rasterized image by rasterizing received image data;
perform a second process of generating rasterized images by rasterizing the received image data a plurality of times by a processing unit that performs the first process; and
contrast the rasterized image obtained by the first process with a plurality of the rasterized images obtained by the second process performed a plurality of times, and check whether the rasterized image obtained by the first process is invalid,
wherein the second process is performed at a time according to a predetermined setting,
wherein the predetermined setting includes a time after printing of the rasterized image obtained by the first process on a recording medium is started,
wherein the predetermined setting interrupts the second process in a case where a condition related to printing performance on the recording medium is satisfied.

2. The information processing apparatus according to claim 1,
wherein the predetermined setting does not include a time after printing of the rasterized image obtained by the first process on the recording medium ends.

3. The information processing apparatus according to claim 1,
wherein, in a case where the rasterized image obtained by the first process is invalid, an instruction is given to interrupt printing of the rasterized image obtained by the first process on the recording medium.

4. The information processing apparatus according to claim 1,
wherein the rasterized image obtained by the first process is checked in a predetermined unit.

5. The information processing apparatus according to claim 4,
wherein the predetermined unit is an entirety of the image data received as one print instruction.

6. The information processing apparatus according to claim 4,
wherein the predetermined unit is a part of the image data received as one print instruction.

7. An information processing apparatus comprising:
a processor configured to:
perform a first process of generating a rasterized image by rasterizing received image data;
perform a second process of generating rasterized images by rasterizing the received image data a plurality of times by a processing unit that performs the first process; and
contrast the rasterized image obtained by the first process with a plurality of the rasterized images obtained by the second process performed a plurality of times, and check whether the rasterized image obtained by the first process is invalid,
wherein the second process is performed according to a predetermined condition,
wherein the predetermined condition is a resolution that is the same as a resolution of the first process,
wherein the second process is interrupted in a case where a condition related to printing performance on a recording medium is satisfied.

8. The information processing apparatus according to claim 7,
wherein, in a case where a check result for each rasterized image obtained by contrasting the plurality of rasterized images obtained by the second process is better than a check result of the rasterized image obtained by the first process, a rasterized image having a good check result is used as a rasterized image for printing.

9. A printing system configured to:
perform a first process of generating a rasterized image by rasterizing received image data;
perform a second process of generating rasterized images by rasterizing the received image data a plurality of times by a processing unit that performs the first process; and
contrast the rasterized image obtained by the first process with a plurality of the rasterized images obtained by the second process performed a plurality of times, and check whether the rasterized image obtained by the first process is invalid,
wherein the second process is performed at a time according to a predetermined setting,
wherein the predetermined setting includes a time after printing of the rasterized image obtained by the first process on a recording medium is started,
wherein the predetermined setting interrupts the second process in a case where a condition related to printing performance on the recording medium is satisfied.

10. A non-transitory computer readable medium storing a program causing an information processing apparatus to realize:
a function of performing a process of generating a plurality of rasterized images by rasterizing received image data a plurality of times by a processing unit; and
a function of contrasting between a plurality of the rasterized images obtained by the processing unit, and checking whether an invalid rasterized image is obtained in a plurality of the rasterized images,
wherein the second process is performed at a time according to a predetermined setting,
wherein the predetermined setting includes a time after printing of the rasterized image obtained by the first process on a recording medium is started,
wherein the predetermined setting interrupts the second process in a case where a condition related to printing performance on the recording medium is satisfied.

* * * * *